(12) United States Patent
Albiez et al.

(10) Patent No.: US 12,553,157 B2
(45) Date of Patent: Feb. 17, 2026

(54) AIRBAG WITH AT LEAST THREE LAYERS, SAID AIRBAG BEING WOVEN INTO A PART

(71) Applicant: GLOBAL SAFETY TEXTILES GMBH, Bad Säckingen (DE)

(72) Inventors: Daniel Albiez, Murg (DE); David Williamson, Lörrach (DE)

(73) Assignee: GLOBAL SAFETY TEXTILES GMBH, Bad Säckingen (DE)

( * ) Notice: Subject to any disclaimer, the term of this patent is extended or adjusted under 35 U.S.C. 154(b) by 0 days.

(21) Appl. No.: 18/700,062

(22) PCT Filed: Sep. 27, 2022

(86) PCT No.: PCT/EP2022/076840
§ 371 (c)(1),
(2) Date: Apr. 10, 2024

(87) PCT Pub. No.: WO2023/066623
PCT Pub. Date: Apr. 27, 2023

(65) Prior Publication Data
US 2024/0336218 A1    Oct. 10, 2024

(30) Foreign Application Priority Data
Oct. 18, 2021    (DE) .................... 10 2021 126 956.3

(51) Int. Cl.
*D03D 1/02*    (2006.01)
*B32B 5/02*    (2006.01)
(Continued)

(52) U.S. Cl.
CPC .............. *D03D 1/02* (2013.01); *B32B 5/024* (2013.01); *B32B 27/12* (2013.01); *B60R 21/233* (2013.01);
(Continued)

(58) Field of Classification Search
CPC ........... B60R 2021/23324; B60R 2021/23514; B60R 2021/23542; B60R 2021/23547;
(Continued)

(56) References Cited

U.S. PATENT DOCUMENTS 6,170,860 B1 *    1/2001    Denz .................... B60R 21/232
                                                        280/730.2
6,220,309 B1 *    4/2001    Sollars, Jr. ............ D03D 11/02
                                                        428/101
(Continued)

FOREIGN PATENT DOCUMENTS

DE    102019002441 A1    10/2020
DE    102020108396 A1     8/2021
(Continued)

OTHER PUBLICATIONS

Search Report for International Application No. PCT/EP2022/076840 dated Jan. 19, 2024.

*Primary Examiner* — Laura Freedman
(74) *Attorney, Agent, or Firm* — Chrisman Gallo Tochtrop LLC

(57) ABSTRACT

The application relates to an OPW airbag which is woven into a part, comprising warp threads and weft threads, which are woven so as to produce at least three woven fabric layers, a lower fabric layer (UG), an upper fabric layer (OG), and a central fabric layer (MG) arranged therebetween. The airbag is characterized in that the warp threads and weft threads of the central fabric layer (MG) float in a selected through-flow region (DSB).

7 Claims, 4 Drawing Sheets

(51) Int. Cl.
  *B32B 27/12* (2006.01)
  *B60R 21/233* (2006.01)
  *B60R 21/2338* (2011.01)
  *B60R 21/235* (2006.01)
  *D03D 11/00* (2006.01)

(52) U.S. Cl.
  CPC ............ B60R 21/235 (2013.01); D03D 11/00 (2013.01); *B32B 2605/00* (2013.01); *B60R 2021/23324* (2013.01); *B60R 21/2338* (2013.01); *B60R 2021/23514* (2013.01); *B60R 2021/23542* (2013.01); *B60R 2021/23547* (2013.01); *D10B 2505/124* (2013.01)

(58) Field of Classification Search
  CPC . B60R 21/233; B60R 21/2338; B60R 21/235; D03D 1/02; D03D 11/00; D03D 11/02; B32B 5/024; B32B 27/12; B32B 2605/00; D10B 2505/124
  See application file for complete search history.

(56) References Cited

U.S. PATENT DOCUMENTS

| | | | | |
|---|---|---|---|---|
| 6,296,276 | B1* | 10/2001 | Ritter | B60R 21/2338 |
| | | | | 280/743.2 |
| 7,264,269 | B2* | 9/2007 | Gu | B60R 21/232 |
| | | | | 280/730.2 |
| 7,597,346 | B2* | 10/2009 | McHugh | B60R 21/233 |
| | | | | 280/730.2 |
| 10,449,922 | B2* | 10/2019 | Yoshida | B60R 21/23 |
| 11,007,969 | B2* | 5/2021 | Albiez | D03D 11/02 |
| 11,208,071 | B2* | 12/2021 | Yoshida | B60R 21/239 |
| 11,618,982 | B2 | 4/2023 | Albiez | |
| 11,766,987 | B2* | 9/2023 | Albiez | B60R 21/2338 |
| | | | | 280/729 |
| 11,866,857 | B2 | 1/2024 | Albiez et al. | |
| 11,891,012 | B2* | 2/2024 | Moran | B60R 21/231 |
| 2008/0026657 | A1* | 1/2008 | Sollars | B32B 3/22 |
| | | | | 442/76 |
| 2015/0367807 | A1* | 12/2015 | Becker | D03D 1/02 |
| | | | | 280/743.1 |
| 2021/0301430 | A1 | 9/2021 | Albiez | |
| 2024/0109508 | A1* | 4/2024 | Albiez | B60R 21/2334 |

FOREIGN PATENT DOCUMENTS

| | | |
|---|---|---|
| EP | 3127758 A1 | 2/2017 |
| JP | H04-043144 A | 2/1992 |
| JP | H09-164893 A | 6/1997 |
| JP | 2004-210257 A | 7/2004 |
| JP | 2009-073220 A | 4/2009 |
| JP | 2011020528 A * | 2/2011 |
| JP | 2014-069729 A | 4/2014 |
| WO | 2020/201018 A1 | 10/2020 |

* cited by examiner

AIRBAG WITH AT LEAST THREE LAYERS, SAID AIRBAG BEING WOVEN INTO A PART

CROSS-REFERENCE TO RELATED APPLICATIONS

This is a National Stage application of PCT international application PCT/EP2022/076840, filed on Sep. 27, 2022, which claims the priority of German Patent Application No. 10 2021 126 956.3, filed on Oct. 18, 2021, all of which are incorporated herein by reference in their entireties.

FIELD OF THE INVENTION

The present invention relates to an OPW airbag with at least three woven fabric layers, a lower woven fabric layer, an upper woven fabric layer and a middle woven fabric layer which is arranged in between.

What are known as far side airbags (also called front center airbags) are arranged, for example, in the driver's seat of motor vehicles on the side which is directed toward the front passenger. These airbags are to be used in future in order to satisfy the new Euro NCAP testing requirements expected to come into force in 2020. Test descriptions in this regard can be found for example on the Internet at "euro-ncap-far-side-test-and-assessment-protocol-v10.pdf". See also the "European New Car Assessment Pro-gramme" at www.euroncap.com.

BACKGROUND OF THE INVENTION

Up to now, it has been possible for the abovementioned airbags to be manufactured only in a highly complex manner in what is known as the cut, seal & sew method. Here, a multiplicity of woven fabric pieces are cut from one or more woven fabric webs, are coated with a sealing compound and are sewn together in an expensive and time-consuming manner to form airbags. In order for it to be possible for a best possible protective effect for the vehicle occupants to be ensured, an airbag of this type has to have a distinct shape and very high rigidity in the inflated state. Known airbags for this intended purpose are complex solutions and are produced at present with high assembly complexity, by, for example, two or more identical or partially identical or different manufacturing parts being cut out from a flat woven textile which is coated with silicone, a sealing compound being sprayed on the edge side, for example in the form of a peripheral bead, and the two or more woven fabric parts being placed above one another subsequently, and then the parts being brought into an adhesive bond. In addition, the woven fabric layers are provided with a seam, in order to ensure sufficient strength of the adhesive seam. Further components, for example catch straps, loops, etc. have to be sewn on in a further process step for shaping (with or without sealing compound). The method is highly time-consuming and expensive, and requires numerous manual process steps. The installation space in the vehicle seat which is available for the complete module is very limited, however. Sewn far side airbags require an increased installation space requirement, since the seams and a plurality of woven fabric layers are very bulky.

EP 3 127 758 A1 has disclosed a far side airbag apparatus which has a two-layer airbag which is sewn multiple times and in the interior of which different woven fabric pieces which lie parallel to the outer layers and are dimensioned and positioned in a targeted manner are sewn in order to control the spatial structure, aimed for in the case of inflation, of the otherwise two-layer airbag. In addition, targeted connecting seams are attached in order to connect the two outer woven fabric layers. The laborious and time-consuming production of far side airbags is apparent from the description in said document.

DE 10 2019 002 441 A1 has disclosed an OPW airbag with at least three woven fabric layers, a lower woven fabric layer, an upper woven fabric layer and a middle woven fabric layer which is arranged in between. In said document, the warp and weft threads of the middle woven fabric layer emerge in a first part region of the OPW airbag from the middle woven fabric layer, and float completely between the lower woven fabric layer and the upper woven fabric layer, and are woven in a second part region of the OPW airbag into the lower woven fabric layer or into the upper woven fabric layer. The construction which is proposed here is highly extensive, however, which makes the installation impossible in the case of highly constricted situations such as, for example, in the case of the arrangement of knee airbags in the motor vehicle.

BRIEF SUMMARY OF THE INVENTION

It is an object of the invention to propose an airbag, by way of which the disadvantages known from the prior art are avoided or at least greatly reduced.

The object is achieved by way of a one piece woven (OPW) airbag as claimed in claim 1, namely a one piece woven (OPW) airbag with warp threads and weft threads which are woven in at least three woven fabric layers, a lower woven fabric layer, an upper woven fabric layer and a middle woven fabric layer arranged in between, characterized in that the warp and weft threads of the middle woven fabric layer float in a selected throughflow region. The OPW airbag according to the invention is advantageously an OPW (one piece woven) airbag which is woven in one piece in a single work operation and, coming fully woven from the weaving machine, is advantageously already equipped and configured with all of its functional features. The construction according to the invention makes a spatially very small and compact configuration of the airbag and therefore, in particular, its use in the construction of arrangements of knee airbags possible. The warp and weft threads which float in the throughflow region are not connected to one another by way of a woven connection. Therefore, the middle woven fabric layer is air-permeable in this region. Thus, for example, air which is fed in between the upper and the middle woven fabric layer can flow through the throughflow region of the middle woven fabric layer and can pass into the region between the middle woven fabric layer and the lower woven fabric layer. The same can of course also likewise take place in the other direction. During the throughflow of the air through the throughflow region, the warp and weft threads of the middle woven fabric layer yield laterally with respect to the respective thread path, and allow the inflowing air to flow through the middle woven fabric layer. The airbag according to the invention does not require a separately arranged so-called inflow region known from the prior art, and can therefore be of considerably smaller overall design than is the case in previously known airbags. In order to fulfill the various prescribed impermeability requirements, it is only to be provided in each case individually with a sealant. In contrast with airbags which are known from the prior art, this results in a great cost saving, and the production time can be shortened. The two chambers can be filled at the same time by one generator or inflator in an inflation operation, and already form a stable airbag. The aim is additionally to satisfy the Euro NCAP requirements with this basic construction.

In one advantageous embodiment of the invention, the OPW airbag is characterized in that the selected throughflow region is surrounded by a border region, in which there is a tighter weave in comparison with the basic weave of the middle woven fabric layer.

Should it not be possible, on account of the construction (keyword: incorporation) of the lower woven fabric layer and/or the upper woven fabric layer, for the middle woven fabric layer to be configured in the throughflow region as a plain weave woven fabric, a tighter weave than the basic weave of the middle woven fabric layer, for example a plain weave, can then be used partially around the region of the floating warp and weft threads as reinforcement.

In a further advantageous embodiment of the invention, the OPW airbag is characterized in that the upper woven fabric layer and the middle woven fabric layer are connected to one another in selected regions via X-tethers. This configuration according to the invention makes accurate control of the individually desired shaping of the space between the upper woven fabric layer and the middle woven fabric layer possible. It is also the case here that, in the selected regions in which two woven fabric layers are connected to one another via X-tethers, the local expansion of the airbag and its dimensions during inflation can advantageously be restricted in a desired manner according to the invention.

In a similar advantageous embodiment of the invention, the OPW airbag is characterized in that the lower woven fabric layer and the middle woven fabric layer are connected to one another in selected regions via X-tethers. The statements in respect of the abovementioned embodiment likewise apply here.

In yet another advantageous embodiment of the invention, the OPW airbag is characterized in that the upper woven fabric layer and the middle woven fabric layer enclose an upper air chamber between them, and the lower woven fabric layer and the middle woven fabric layer enclose a lower air chamber between them, and in that the upper air chamber has a generator mouth for receiving a generator. The advantage of this arrangement consists, in particular, in that all the air chambers of the airbag can be filled via a single generator mouth.

In yet another advantageous embodiment of the invention, the OPW airbag is characterized in that it has reinforcing chambers in the upper and/or lower air chamber. This configuration permits curvatures, controlled according to the invention during inflation, of a part of the airbag with respect to another part of the airbag.

In yet a further advantageous embodiment of the invention, the OPW airbag is characterized in that X-tether columns are arranged in the upper and/or lower air chamber.

By way of different arrangements of X-tether columns and reinforcing chambers, curvatures of individual portions with respect to other portions can be achieved in a targeted manner during the inflation of the airbag.

Finally, in yet another advantageous embodiment of the invention, the OPW airbag is characterized in that it is provided with a polymer layer on its outer surfaces. The coating with a sealing compound of this type advantageously increases the air impermeability of the woven fabric layers and therefore the dimensional stability of the airbag under inflation pressure.

In particular, the subject matter of the present invention can be used in the area of knee airbags.

BRIEF DESCRIPTION OF THE DRAWINGS

For improved comprehension of the invention, it will be described briefly in the following text on the basis of one exemplary embodiment with the aid of a drawing.

DESCRIPTION OF EXAMPLE EMBODIMENTS

Figure 1:
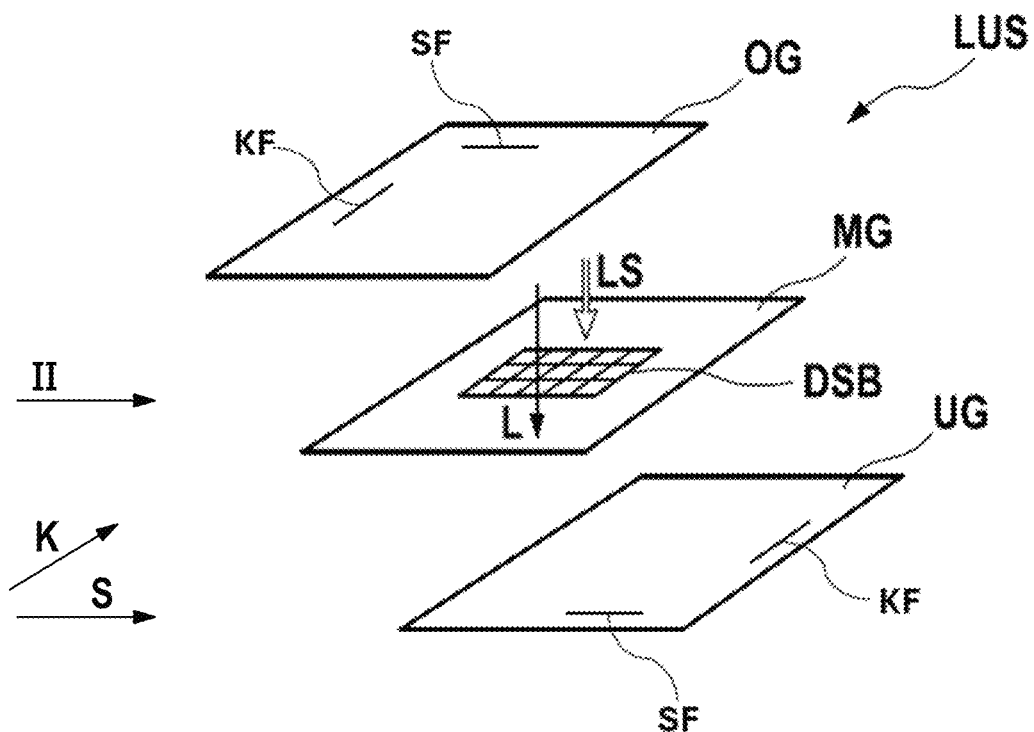
FIG. 1 greatly diagrammatically shows a perspective view of of three layers of an OPW airbag in the non-inflated state, its three layers being shown in an exploded view.

FIG. 1 shows, in a greatly exploded state, the arrangement of three woven fabric layers, namely an upper woven fabric layer OG, a middle woven fabric layer MG and a lower woven fabric layer UG above one another. The upper woven fabric layer OG and the lower woven fabric layer UG contain warp threads KF and weft threads SF which are woven with one another continuously, for example, in a plain weave; just like the middle woven fabric layer MG, although there the warp threads KF and weft threads SF run further in the middle woven fabric layer in a throughflow region DSB which is shown approximately centrally by way of example by a rectangularly shaped checkered area, they are not woven with one another but rather float, that is to say (as a person skilled in the art knows), the warp and weft threads KF, SF in this region are not connected to one another by way of woven bonds, but rather lie in the woven fabric layer such that they can be displaced parallel and transversely with respect to their running direction. Should an air flow LS be applied in the throughflow region DSB transversely with respect to the middle woven fabric layer MG, the warp and weft threads KF, SF in this region yield laterally and make a throughflow of the middle woven fabric layer in this region in the illustrated direction L possible.

Figure 2:
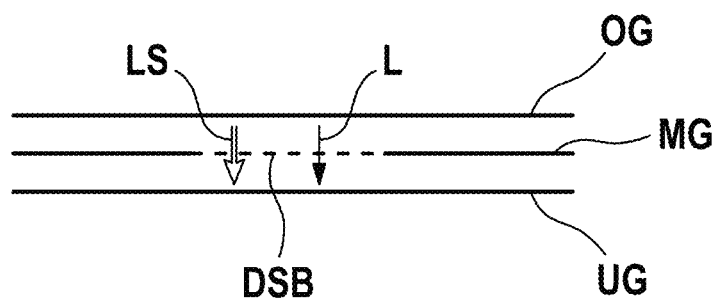
FIG. 2 greatly diagrammatically shows the OPW airbag from FIG. 1 in a side view.

On the left in FIG. 1, the running direction of the warp and weft threads KF, SF is indicated by two arrows, K for warp direction and S for weft direction. An arrow II is intended to indicate the viewing direction of the woven fabric layers in accordance with the view of FIG. 2. FIG. 2 shows the woven fabric layers OG, MG, UG likewise somewhat exploded for improved clarity. In fact, in the rest state, the woven fabric layers lie flatly above one another so as to bear tightly against one another. The throughflow region DSB can be seen in the section as a dashed line, as can the arrow L and a further arrow which is intended to indicate the movement of the above-addressed air flow LS.

Figure 3:
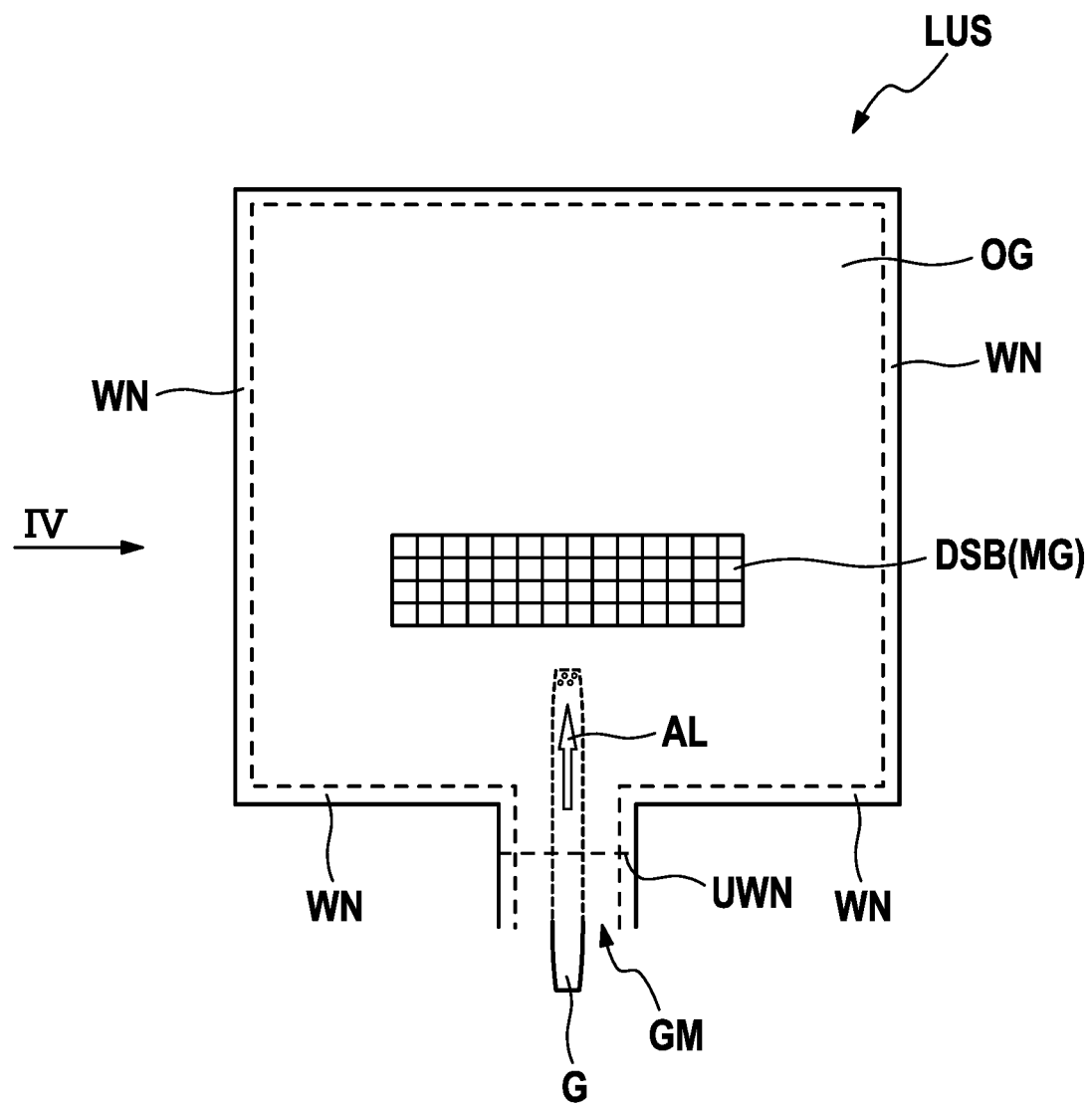
FIG. 3 greatly diagrammatically shows one exemplary embodiment of an OPW airbag according to the invention with an inserted inflator in plan view.

While the above-described FIGS. 1 and 2 show purely diagrammatic illustrations, FIG. 3 already shows an exemplary one piece woven (OPW) airbag LUS according to the invention. The airbag LUS of square configuration by way of example can be seen in plan view, and there is a view of the upper woven fabric layer OG, below which (as viewed in the viewing direction) the middle woven fabric layer MG, of which only the throughflow region DSB which is actually not visible in this view is indicated, and the lower woven fabric layer UG lie. The three abovementioned woven fabric layers OG, MG, UG are woven to one another "in one layer" on their periphery in the region of a woven seam WN to form a single woven layer, the upper woven fabric layer OG and the middle woven fabric layer MG enclosing a space which is called upper chamber OLK, as can also be seen clearly from FIG. 4 which shows the view according to arrow IV from FIG. 3, and the lower woven fabric layer UG and the middle woven fabric layer MG enclosing a space which is called lower chamber ULK. The three woven fabric layers merge as it were in a woven seam WN and form a single layer in this region. A generator G is arranged in a generator mouth GM so as to protrude into the upper chamber OLK. As soon as the generator G is activated, it blows air or gas through openings which are arranged, for example, at its head in the direction of the arrow AL into the upper chamber OLK, as a result of which the latter is filled. Approximately at the same time, air flows according to the arrows L through the throughflow region DSB, unimpeded by the floating threads of the throughflow region DSB, into the lower chamber ULK of the airbag LUS and also fills the lower chamber ULK. The woven fabric layers of the lower chamber ULK, that is to say the lower woven fabric layer UG and the middle woven fabric layer MG, are woven to one another via a diagrammatically shown woven seam UWN which in this way closes off the lower chamber ULK to the outside.

Figure 4:
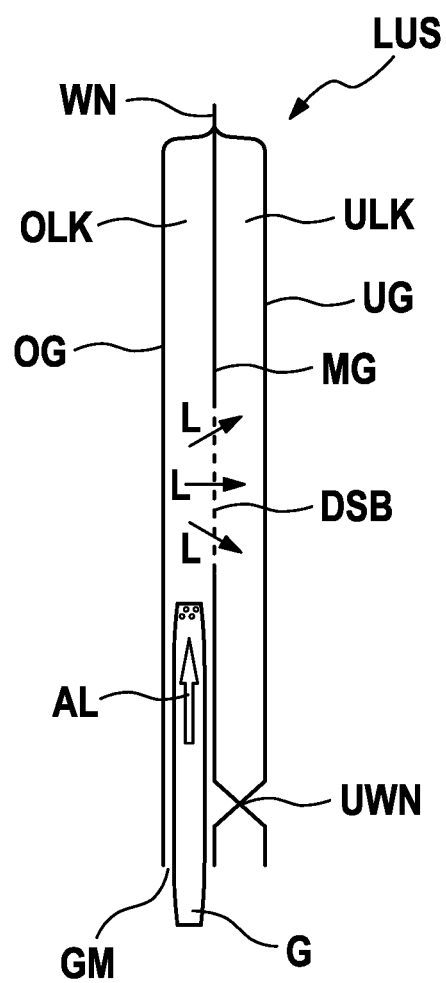
FIG. 4 greatly diagrammatically shows the OPW airbag from FIG. 3 as viewed from the left.
Figure 5:
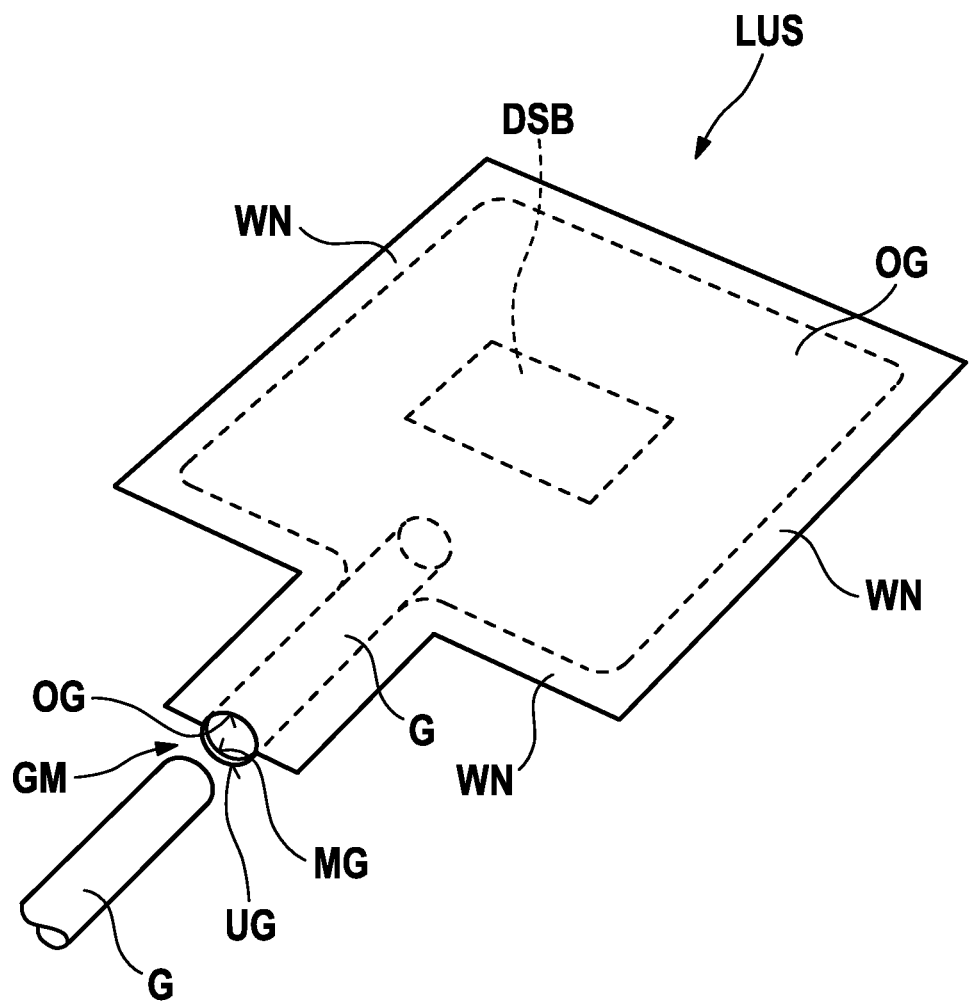
FIG. 5 greatly diagrammatically shows one exemplary embodiment of an OPW airbag according to the invention with a generator mouth with an inflator or generator inserted between the upper and the middle woven fabric layer in the generator mouth.

The generator G which is shown arranged rather loosely in the air chamber OLK in FIG. 4 actually bears tightly against the upper woven fabric layer OG and the middle woven fabric layer MG, as is shown in FIG. 5. The generator G which is shown using solid lines is shown arranged in the airbag using dashed lines. The perspective illustration according to FIG. 5 shows the non-inflated airbag LUS with a generator G introduced into the generator mouth GM. It is also intended to be shown here that the generator G comes to lie between the upper woven fabric layer OG and the middle woven fabric layer MG. The throughflow region DSB which is shown using dashed lines in FIG. 5 is actually not visible in the illustration, but rather is illustrated merely for clarity.

The situation which is shown in FIG. 4 shows an idealized situation for reasons of simplicity, in which situation the airbag according to the invention is inflated. In comparison with known solutions (from the prior art), the compact, small construction of an airbag according to the invention can be seen, which advantageously does not have a dedicated inflow region and therefore is highly suitable in constricted spatial conditions such as, for example, in the foot region of a motor vehicle for knee airbags.

The abovementioned throughflow region DSB then ensures that the air chamber which lies above or below it can be filled, upon activation of the generator, not slowly but rather rapidly and dynamically with gas, by the middle woven fabric layer MG having partially floating warp and weft threads KF, SF. In this region, the floating threads of the middle MG form an air passage, through which a dynamic air exchange between the two air chambers OLK, ULK which lie above one another is made possible.

The woven fabric layers of the airbag according to the invention can optionally be provided with what are known as X-tethers arranged at targeted locations, in order to limit the local expansion during inflation. The aim is, inter alia, to propose an airbag, by way of which increased rigidity and improved three-dimensional shaping are possible in the inflated state. It is a matter here of proposing solutions, even in constricted situations at locations which are suitable on the design side, via one or more air passages (for example, such as the throughflow region DSB discussed here) which are provided by means of floating warp and weft threads, connect the upper and lower air chamber OLK, ULK to one another in terms of flow, and ensure a rapid exchange of air.

The abovementioned reinforcing weave, for example plain weave in the middle woven fabric layer around the throughflow region, is intended to ensure that no damage occurs in the throughflow region as a result of mechanical or thermal loading. It is important that the cross section of the throughflow region DSB maintains the structurally intended size, in order to obtain the planned filling speed of individual air chambers which lie above one another.

Should it not be possible, on account of the construction (keyword: "incorporation") of the lower woven fabric layer UG and/or the upper woven fabric layer OG, for the middle woven fabric layer MG in the chamber region, in which the air is to be led through according to the invention by means of floating warp and weft threads, to be configured as a plain weave woven fabric, then a tighter weave than the basic weave of the middle woven fabric layer MG can be used as reinforcement at least partially around the floating region, for example a plain weave.

The filling speed of the chambers can likewise be influenced by way of the area size of the throughflow region in the middle woven fabric layer. This means that, for example, the upper air chamber which is filled here by means of the generator by way of example can be loaded with internal pressure more rapidly or more slowly by way of increasing or decreasing the cross section of the throughflow region to the lower air chamber. For that air chamber which is not filled directly by the generator but rather is filled only indirectly through the throughflow region in the middle woven fabric layer, this likewise means that it can be filled more dynamically or even less dynamically in the abovementioned interdependency. As a result, the airbag can be filled more rapidly or more slowly in the lower or upper air chamber in a targeted manner. This can of course be seen only in the highly dynamic range, but can make a positive contribution to the optimization of the deployment/expansion of the airbag according to the invention out of an airbag module.

LIST OF DESIGNATIONS

AL Inflation air

DSB Throughflow region

G Generator

GM Generator mouth

L Arrow

LS Air flow

LUS Airbag

MG Middle woven fabric layer

OG Upper woven fabric layer

OLK Upper air chamber

UG Lower woven fabric layer

ULK Lower air chamber

UWN Lower woven seam

WN Woven seam

The invention claimed is:

1. A one piece woven (OPW) airbag with warp threads and weft threads which are woven in at least three woven fabric layers, a lower woven fabric layer (UG), an upper woven fabric layer (OG) and a middle woven fabric layer (MG) arranged in between,
  wherein the warp and weft threads of the middle woven fabric layer (MG) are interwoven in a basic weave,
  wherein in a selected throughflow region (DSB) located within the middle woven fabric layer (MG), the warp and weft threads of the middle woven fabric layer (MG) are configured to lie within the middle woven fabric layer (MG) and be displaced parallel and transversely with respect to a running direction thereof,
  wherein the middle woven fabric layer (MG) is permeable to air in the throughflow region (DSB), and
  wherein the throughflow region (DSB) is surrounded by a border region as reinforcement, the border region having a tighter weave than the basic weave of the middle woven fabric layer (MG).

2. The OPW airbag as claimed in claim 1, wherein the upper woven fabric layer (OG) and the middle woven fabric layer (MG) are connected to one another in selected regions via X-tethers.

3. The OPW airbag as claimed in claim 1, wherein the lower woven fabric layer (UG) and the middle woven fabric layer (MG) are connected to one another in selected regions via X-tethers.

4. The OPW airbag as claimed in claim 1, wherein
  the upper woven fabric layer (OG) and the middle woven fabric layer (MG) enclose an upper air chamber (OLK) between them, and the lower woven fabric layer (UG) and the middle woven fabric layer (MG) enclose a lower air chamber (ULK) between them, and wherein the upper air chamber (OLK) has a generator mouth (GM) for receiving a generator (G).

5. The OPW airbag as claimed in claim 4, wherein reinforcing chambers are present in the upper and/or lower air chamber (OLK).

6. The OPW airbag as claimed in claim 5, wherein X-tether columns are arranged in the upper and/or lower air chamber (OLK).

7. The OPW airbag as claimed in claim 1, wherein a polymer layer is located on at least one outer surface.

* * * * *